United States Patent [19]

Jensen

[11] 4,096,558
[45] Jun. 20, 1978

[54] METHOD OF CONTROLLING A THREE-PHASE INVERTED RECTIFIER AND EQUIPMENT FOR CARRYING OUT THIS METHOD

[75] Inventor: Arne Jensen, Sonderborg, Denmark

[73] Assignee: Danfoss A/S, Nordborg, Denmark

[21] Appl. No.: 746,390

[22] Filed: Dec. 1, 1976

[30] Foreign Application Priority Data

Dec. 3, 1975 Germany .............................. 2554222

[51] Int. Cl.² ............................................. H02M 1/12
[52] U.S. Cl. ...................................... 363/41; 318/227
[58] Field of Search ................... 318/227; 363/39–42, 363/137

[56] References Cited

U.S. PATENT DOCUMENTS

| 3,376,490 | 4/1968 | Osugi | 363/41 |
| 3,573,601 | 4/1971 | Esser | 363/42 |
| 3,649,902 | 3/1972 | Dunbar | 363/41 |
| 3,916,285 | 10/1975 | Iwata et al. | 363/41 |
| 3,958,171 | 5/1976 | Sekino | 363/41 |
| 3,971,972 | 7/1976 | Stich | 363/41 X |

Primary Examiner—William M. Shoop

[57] ABSTRACT

The invention relates to a method and apparatus for controlling a three-phase inverted rectifier. In this method each half wave is divided into six intervals with the third and fourth intervals forming a first zone with a constant voltage level, the second and fifth intervals forming a second zone with impulses of varying width, and the first and sixth intervals forming a third zone with impulses of varying width narrower than the impulses in the second zone. The narrower and wider impulses are treated similarly with regard to their number and have a constant width ratio as the result of a factor X. The center spacings of the narrower and wider impulses are equal. The number of impulses in each of the zones two and three is $n$. When $n$ is 1.5, X should be about 0.78. Apparatus for carrying out the method includes a cycle generator, a zone signal generator which may be a ring counter, a wave train generator which may be a voltage controlled oscillator, two pulse generators and a logic section which, in dependence on the zone signals and the impulse width signals, produces switching control signals for operating the switching element of the inverted rectifier.

15 Claims, 6 Drawing Figures

METHOD OF CONTROLLING A THREE-PHASE INVERTED RECTIFIER AND EQUIPMENT FOR CARRYING OUT THIS METHOD

The invention relates to a method of controlling a three-phase inverted rectifier with a constant DC voltage supply and adjustable frequency and amplitude of the fundamental oscillation of the interlinked output voltage, particularly for feeding an AC motor, wherein the output voltage is formed alternately by the one and the other potential of the DC voltage supply and each half-wave of the phase voltages leads the associated potential continuously in first zones and in the form of impulses of variable width in second zones, as well as to equipment for carrying out this method.

To change the amplitude of the fundamental oscillation of the output voltage of an inverted rectifier, the DC voltage to be supplied can be changed in an intermediate circuit. The curve contour of the output voltage will then remain constant independently of the amplitude. In departure from a pure rectangular signal, a curve contour can therefore be selected for each half-wave that is comparatively poor in higher harmonics.

The present invention is concerned with a different possibility, in which the inverted rectifier is energised by a constant DC voltage and which is often preferred because of omission of the controllable intermediate circuit. The change in amplitude of the output voltage occurs in that during each half-wave a plurality of impulses of constant amplitude but variable width are used. In this case it is, however, very difficult to keep the higher harmonic content low over the entire control range. In order to keep the number of switch-overs and thus the switching losses as small as possible, it is also already known to provide the impulses of variable width merely in the central range of 60° to 120° of each half-wave but to use a constant voltage in the initial range 0° to 60° and in the terminal range 120° to 180°. Such features further complicate the suppression of the higher harmonics.

In the known control equipment for a three-phase inverted rectifier which is particularly intended to feed an AC asynchronous motor, a first control signal is on the one hand fed to a cycle generator of which the cycle signals are, after division, fed to a zone signal generator which characterises the phase half-waves. The first control signal is also used to produce a triangular wave train which is intersected by the second control signal in an impulse width signal generator, impulse width signals being produced in dependence on the points of intersection. In a logic portion, the zone signals and the impulse width signals are interlinked in such a way that during the first 60° of each half-wave a constant potential is available at the output terminal of the inverted rectifier whereas during the second 60° width-modulated impulses and during the last 60° again a constant potential are available.

The invention is based on the problem of providing a method of the aforementioned kind in which the higher harmonic content can be kept very low over a large control range.

This problem is solved according to the invention in that each half-wave is sub-divided into six intervals of 30° each of which the third and fourth intervals form the first zone and the second and fifth intervals lead $n$ wider impulses of the width 2B and the first and sixth intervals lead $n$ narrower impulses of the width X.2B, wherein $0.5 < X < 1$, $n \geq 1.5$ and B is variable.

With this procedure, one retains the advantage of a reduced switching frequency because in the 60° to 120° zone of each half-wave there is a constant potential at the output terminal. By reason of the fact that in the first interval 0° to 30° and in the sixth interval 150° to 180° use is made of narrower impulses than in the second interval of 30° to 60° and in the fifth interval of 120° to 150°, the higher harmonic content can also be kept small with variable impulse width. Not only the fifth and seventh harmonics can be substantially suppressed but also substantial parts of the eleventh and thirteenth harmonics can be eliminated. The third and ninth harmonics are not present anyway because of the interlinking of the output voltage. By reason of the fact that the narrower impulses and the wider impulses are treated similarly with regard to their number and have a constant width ratio as a result of the factor X, each alteration in the case of the one type of impulse leads to a corresponding change for the other type of impulse, so that the control method can be realized with a comparatively simply constructed circuit.

Further, the centre spacings of the wider and the narrower impulses can be equal. With this feature the higher harmonic content can be reduced still further and the associated circuit can be still further simplified. Similar advantages apply when, in the case of $n < 2$ the centre spacings of the wider or the narrower impulses are equal.

It has been found that the best results in reducing the higher harmonic content over a large regulating range can be obtained if X lies between 0.7 and 0.85. With $n = 1.5$, X should be about 0.78 and with $n = 2$, X should be about 0.75 and for larger values of $n$, X should be about 0.73.

By means of impulses exceeding the interval limits, $n$ can be a fraction, particularly 3/2, 5/2, 7/2 etc. In this way $n$ can be set in finer steps, whereby further improvements can be achieved with regard to the higher harmonic content. In addition, the frequency of switching can be reduced because in most cases half a number smaller is sufficient. For example, in most cases $n = 1.5$ is adequate instead of $n = 2$.

In a preferred embodiment, the wider impulses are obtained by the points of intersection between a first control voltage and the narrower impulses are obtained by the points of intersection between a second control voltage having a fixed relationship to the first control voltage and a wave train having a frequency which is a multiple of the output frequency. Feasible wave trains are triangular voltages, trapezoidal voltages, saw tooth voltages and the like.

In some cases it is recommendable for $n$ to be changeable in relation to the desired frequency of the output voltage and to increase with a drop in frequency. The lower the frequency of the output voltage, the longer is the time available for each half-wave. By increasing the impulse number $n$, the spaces remaining between the impulses are reduced. This also contributes to a reduction in the higher harmonic content. Equipment for carrying out the method comprises a cycle generator of which the frequency is determined by the first control signal, and zone signal generators controlled thereby, and also comprises a wave train generator of which the frequency is likewise determined by the first control signal and an impulse width signal generator which delivers impulse width signals in dependence on the points of intersection between the wave train and a second control signal, and further comprises a logic portion which, in dependence on the zone signals and the impulse width signals, produces switching control signals for operating the switching elements of the inverted rectifier, and is characterised according to the invention in that the zone signal generator produces different interval signals each extending over 30°, that two impulse width generators fed by the same wave train are provided, which generators are fed with first and second control voltages that differ from one another and are derived from the second control signal and which deliver width signals for the wider or for the narrower impulses, respectively, and that the logic portion delivers switching control signals when interval signals for the third and fourth interval, when width signals for the wide impulses and interval signals for the second and fifth interval, and when width signals for the narrow impulses and interval signals for the first and sixth interval are present. This leads to a simple circuit in which the frequency of the output voltage of the inverted rectifier can be predetermined by the first control signal and the amplitude of the first harmonic of the output voltage can be predetermined by the second control signal. In some cases, the first and second control signal can be formed by a common control signal.

Desirably, one ensures that a voltage-controlled oscillator produces a triangular wave train, peaks of the wave train initiate cycle impulses in the cycle generator, and summation and/or division elements are connected between the cycle generator and zone signal generator. In this case a single oscillator for initiating the wave train and the cycle impulses is sufficient. At the same time, the summation and/or division elements ensure that the wave train has a predetermined relationship to the zone signals.

If the summation element adds the cycle impulses initiated by the positive peaks of the wave train and the cycle impulses initiated by the negative peaks, and the dividing element permits only every third cycle impulse to pass, narrower impulses exceed the 0° and 360° limit and wider impulses exceed the 60° and 120° limit. This results in an impulse number $n = 1.5$.

For automatically changing the impulse number $n$, it is favourable if in the line of the first control circuit there is connected a network which multiplies the first control signal by $m$, if the cycle generator is followed by a gate dividing the number of cycle impulses by $m$ and if a comparator monitors the size of the first control signal and, in dependence thereon, changes $m$. As soon as the first control signal decisive for the inverted rectifier frequency exceeds one or more limiting values upwardly, the switching number $n$ is reduced and reversed.

A particularly simple circuit is obtained if the width signal generator is supplied with the second control signal as the first control voltage for the wider impulses and the width signal generator is supplied as the second control voltage for the narrower impulses with a voltage tapped from a voltage divider fed by the second control signal.

It is also favourable if for each phase there is provided a bistable multivibrator which is controlled by an interval signal and delivers half-wave signals, and the logic portion for each switching element comprises an OR element to which the third and fourth interval signals are supplied direct, the width signals for the wider impulses are supplied by way of an AND element which is also fed by the second and fifth interval signals, and the width signals for the narrower impulses are supplied constantly, and the output of which is linked to the half-wave signal in an AND element and in a NOR element. On the one hand, this leads to a very simple logic portion and on the other hand to a similar control for all phases.

As switching elements for the inverted rectifier, all elements known for this purpose are feasible, for example thyratrons, thyristors and the like. However, the equipment is particularly suitable for transistors which are controllable by a simple voltage but, because of the weakness in higher harmonics, are practically not endangered by current peaks at all and can therefore be relatively highly loaded.

The invention will now be described in more detail with reference to the examples illustrated in the drawing, in which.

Figure 1:
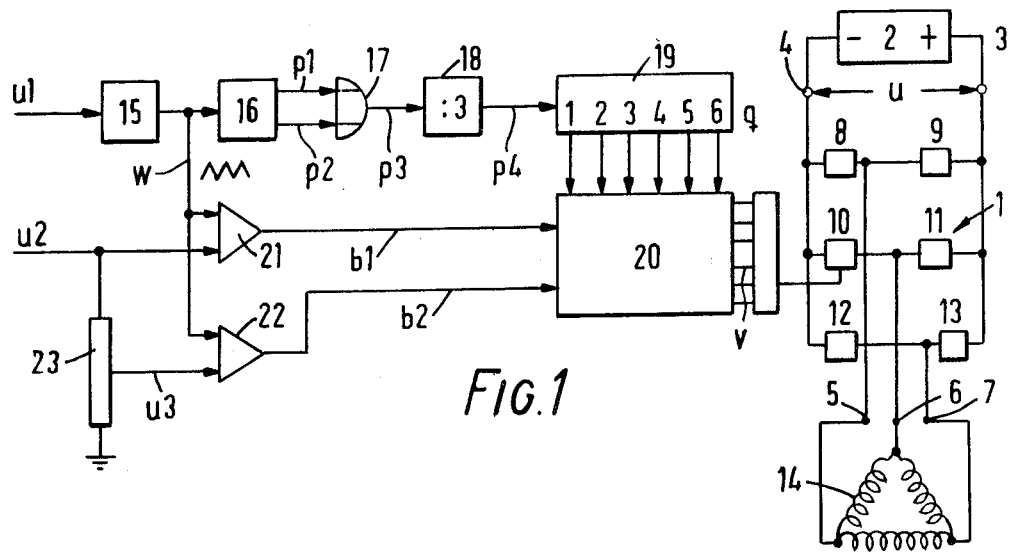
FIG. 1 is a diagrammatic circuit diagram of the equipment according to the invention.

FIG. 1 firstly shows a conventional inverted rectifier 1 which is supplied with a voltage U from a constant DC voltage supply 2 so that a positive potential exists at the input terminals 3 and a negative potential exists at the input terminal 4, each amounting to U/2. The DC voltage supply 2 can, for example, consist of a battery or a rectifier arrangement fed by AC. The output terminals 5, 6 and 7 are each connected between two series connected switching elements 8, 9, 10 and 11 or 12 and 13. One of the switching elements of each pair is conductive and the other is blocked. An AC load, in this case a delta-connected asynchronous motor 14 is connected to the output terminals. The frequency of the fundamental oscillation of the output voltage at the terminals 5 to 7 and thus the rotary speed of the asynchronous motor 14 is variable with the aid of a first control signal $u1$, and the amplitude of the fundamental oscillation of the output voltage is variable with the aid of a second control signal $u2$. Both control signals can be led in the same direction or even formed by a common signal.

The first control signal $u1$ is a voltage which influences a voltage-controlled oscillator 15 which produces a triangular wave train $w$. The frequency of this wave train is proportional to the first control signal $u1$. A cycle generator 16 produces cycle impulses $p1$ when determining the lower peaks and cycle impulses $p2$ when determining the upper peaks. These cycle impulses are summated in an OR element 17 so that the cycle impulses $p3$ are produced. These are divided by three in a divider 18. The resulting cycle impulses $p4$ are fed to a six-stage ring counter 19 which, at its outputs, successively produces every 30° interval signals $q1$ to $q6$ corresponding to the inverted rectifier frequency. These are fed to a logic portion 20.

In addition, the wave train $w$ is supplied to two comparators 21 and 22. The comparator 21 is fed with a first control voltage equal to the second control signal $u2$. At the ouput there occurs a first width signal $b1$ for wider impulses when the control voltage $u2$ is larger than the voltage of the wave train $w$. The second comparator is fed with a second control voltage $u3$ which is tapped from the tapping of a voltage divider 23 supplied with the second control signal $u2$. Two width signals $v2$ occur at its output when the second control voltage $u3$ is larger than the voltage of the wave train $w$. The width signals $b1$ and $b2$ are also fed to the logic portion 20.

The outputs of the logic portion feed switching control signals $v$ to a converter in which they are adapted to the control inputs of the switching elements 8 to 13.

Figure 2:
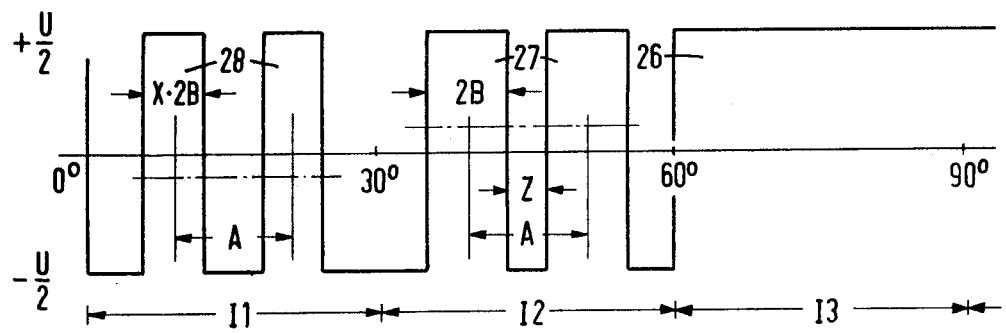
FIG. 2 shows a portion of the phase voltage produced by the method according to the invention.

FIG. 2 illustrates the first half of a half-wave of the kind that is desired to be produced by the invention. This half-wave is symmetrical to the 90° plane. The following half-wave is symmetrical to the 180° point. The half-wave is sub-divided into six 30° intervals I1 to I6 (only the intervals I1 to I3 being shown in FIG. 2). In the intervals I3 and I4, the phase voltage always corresponds to the potential $+U/2$. This forms continuous blocks 26. In the intervals I2 and I5, n wider impulses 27 are provided, each with a width of 2B. In the intermediate spaces the negative potential $-U/2$ obtains. n narrower impulses 28, each with a width of X.2B are provided in the intervals I1 and I6. X lies between 0.5 and 1, preferably from 0.73 to 0.78. In the intervals I1 and I2, this results in roughly the mean values indicated in chain-dotted lines. The spaces A between the centres of the impulses 27 and 28 are equal. If the impulse number $n$ is larger than 2 instead of 2 as here illustrated, the centre spacings A of the impulses 27 or the impulses 28 can also be equal. In many cases the centre spacing between differently wide impulses is also equal to A.

Figure 3:
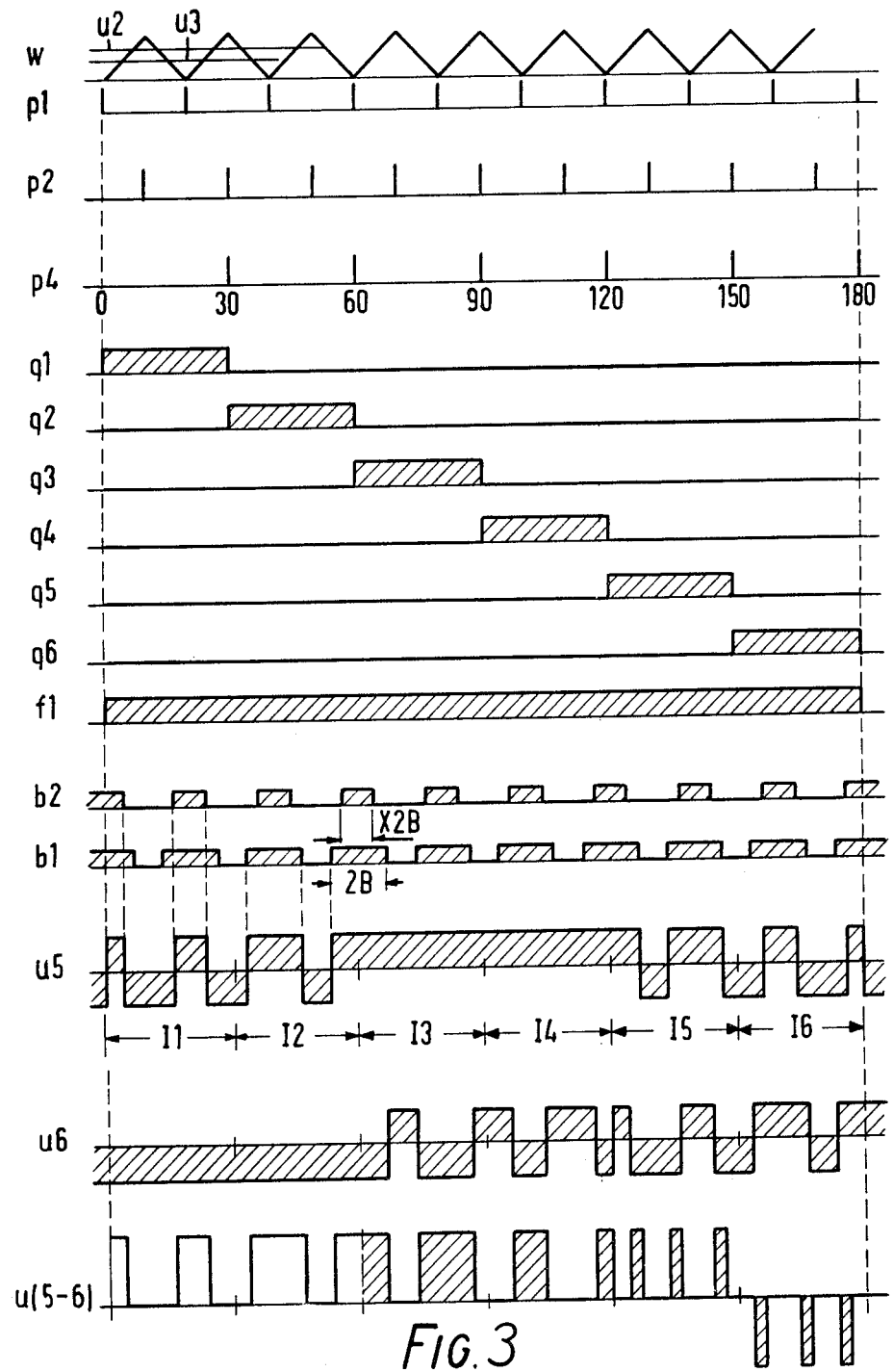
FIG. 3 shows in a lateral arrangement a plurality of the signals and voltages occurring in the equipment.

FIG. 3 illustrates above one another in a time relationship different signals and voltages occurring in the circuit according to FIG. 1. They are in each case illustrated over a half period 0°–180°. In the first line, the triangular wave train $w$ is shown of which the frequency is 18 times as large as the frequency of the fundamental oscillation of the output voltage of the inverted rectifier.

The cycle impulses $p1$ are derived from the lower peaks and the cycle impulses $p2$ from the upper peaks of this wave train $w$. By summation and division by three one obtains the cycle impulses $p4$ from which the interval signals Q1–Q6 are obtained in the ring counter 19. A half-wave signal $f1$ extends over the entire half-wave and will be explained in more detail in conjunction with FIG. 5.

By intersecting the wave train $w$ with the control voltage $u2$, one obtains the width signals $b1$ for the wider impulses 27 and by intersecting with the control voltage $u3$ one obtains the width signals $b2$ for the narrower impulses 28. These width signals are in each case symmetrical to the cycle impulses $p1$.

If, now, the width signals $b2$ are to be present in the intervals I1 and I6, the width signals $b1$ in the intervals I2 and I5 and a constant potential in the intervals I3 and I4 as is prescribed, the voltage $u5$ is obtained for example at the output terminal 5. Width signals $b1$ project beyond the 60° and 120° limit and width signals $b2$ project beyond the 0° and 360° limit. Consequently the impulse number $n = 1.5$. If the voltage $u5$ is linked with the voltage $u6$ that is displaced by 120° at the output terminal 6, one obtains the linked voltage $u(5-6)$ which has a course indicated in the next lower line. For reasons of circuitry, the third and ninth harmonics are already omitted at this voltage.

By arranging the narrower and wider impulses 27 and 28 in the intervals I1, I2, I5 and I6, one not only substantially eliminates the fifth and seventh harmonic but also the eleventh and thirteenth harmonic can be suppressed to a considerable extent.

Figure 4:
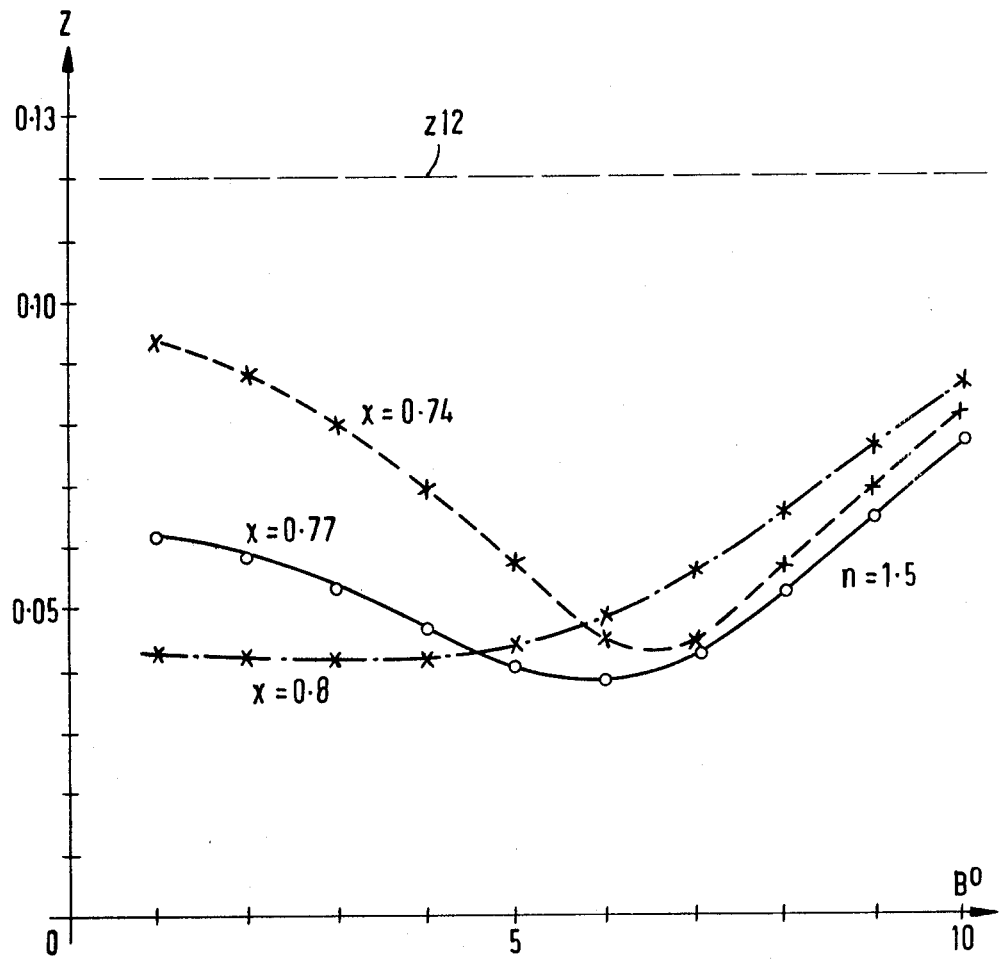
FIG. 4 is a diagram of the higher harmonic content across the impulse width.

In FIG. 4, the distortion factor $z$ has a function of the higher harmonics of the order 5, 7, 11 and 13 are shown above the value B measured in degrees, the distortion being defined as follows:

$$z = \sqrt{\Sigma_5^{13} D^2} : \sqrt{\Sigma_1^{13} D^2}$$

wherein D1 is the amplitude of the first harmonic and D3, D5, D7, D9, D11 and D13 are the amplitudes of the higher harmonics. The diagram applies to an impulse number $n = 1.5$. It will be seen that the curves differ in dependence on the factor X but that at the stated values they result in $z$-values under 0.1 over the entire operating range. For purposes of comparison, a line $z12$ is shown which gives the distortion factor with a conventional 12 pulse system with variable DC voltage intermediate circuit.

Figure 5:
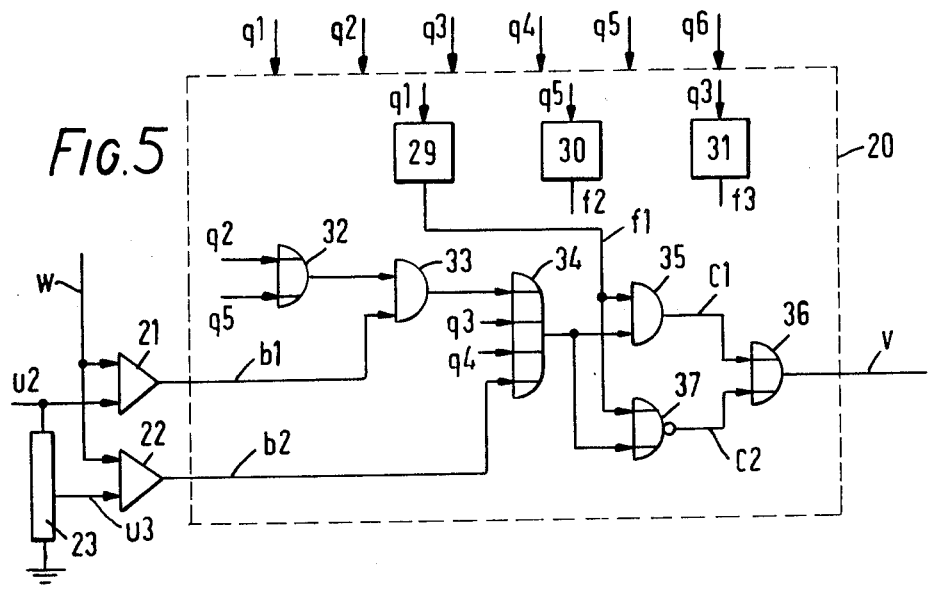
FIG. 5 shows an embodiment of the logic portion.

FIG. 5 gives one possible circuit for the logic portion 20. Three bistable multivibrators 29, 30 and 31 are provided which are controlled by the interval signals $q1$, $q5$ and $q3$, respectively. Upon first occurrence of the interval signal $q1$, the bistable multivibrator 29 delivers a half-wave signal $f1$ which lasts until the next occurrence of the interval signal $q1$. Similarly, half-wave signals $f2$ and $f3$ are produced in the bistable multivibrators 30 and 31.

The interval signals $q2$ and $q5$ are fed by way of an OR element 32 and are linked in an AND element 33 with the width signal $b1$. The linked signal is fed to an OR element 34 which is also fed with the interval signals $q3$ and $q4$ as well as constantly with the width signal $b2$. The output signal of the OR element 34 is linked in an AND element 35 with the half-wave signal $f1$ and is delivered through an OR element 36 as a switching control signal $v$. In order that the associated valve will also receive the correct information during the next following half-wave, the output signal of the OR element 34 and the half-wave signal $f1$ are linked in a NOR element 37 and likewise passed on through the OR element 36.

The manner of operation will be evident from FIG. 3. During the intervals I3 and I4, the interval signals $q3$ and $q4$ serve as control signals. During the intervals I2 and I5, the width signals $b1$ serve as control signals. The width signals $b2$ are supplied during the entire half-wave but are operative only during the intervals I1 and I6 because in the remaining intervals they are covered by the signals $b1$ or $q3$ and $q4$. Consequently, $v$ corresponds to the upper portion of the output voltage $u5$.

If the output signals of the elements 35 and 37 are designated $c1$ and $c2$, the complete valve signal $v$ is given by $$v = c1+c2 = f1\,[X2B+(q2+q5)2B + q3+q4] + \overline{f1+[X2B + (q2+q5)2B + q3 + q4]}$$

The control signal for the respective other valve of a pair is given by negation of the switching control signal $v$.

Figure 6:
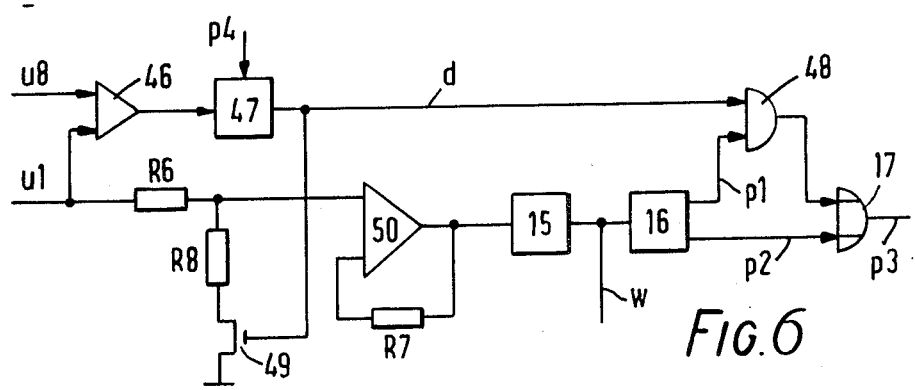
FIG. 6 is a modification of the circuit for changing the impulse number.

If the frequency of the output voltage drops, the spacings between the individual impulses 27 and 28 also become larger. To avoid undesirable current harmonics, it is then desirable to increase the impulse number $n$. Conversely, the spacing Z between adjacent impulses becomes smaller with an increase in frequency, so that it is desirable to reduce the impulse number $n$ again. This can occur automatically with the circuit shown in FIG. 6. A comparator 46 compares the control signal $u1$ which is decisive for the output frequency with a DC voltage $u8$. As long as the control signal $u1$ is larger than the limiting value $u8$, the comparator 46 delivers a signal by which a flip-flop 47 is prepared in such a way that it delivers a permanent signal $d$ on occurrence of a cycle impulse, e.g. $p4$. Since an AND element 48 is connected in the path of the cycle impulse $p1$, the conditions described in conjunction with FIG. 3 arise only if the permanent signal $d$ is present. At the same time, the permanent signal acts on a transistor 49, e.g. a MOS transistor acting as an electronic switch. In front of the voltage-controlled oscillator 15 there is an amplifier 50 having a forward resistance R6 and feedback resistance R7. The electronic switch 49 is disposed in a transverse branch in series with a resistance R8. When the transverse branch is switched on, the amplification factor of the element R6, R8 drops to one half when the resistances are equal. Only if the first control signal $u1$ falls below the limiting value $u8$ and the output signal of the comparator 46 is omitted will the permanent signal $d$ also disappear and only the cycle impulses $p2$ be effective. At the same time, however, the signal voltage effective at the oscillator 15 is doubled because the amplification factor of the amplifier 50 is changed. This leads to the fact that the frequency of the wave train $w$ is also doubled. As an end effect, the output frequency of the inverted rectifier remains the same but the impulse number $n$ has been doubled.

I claim:

1. A method of controlling a three-phase inverted rectifier with a constant DC voltage supply and adjustable frequency and amplitude of the fundamental oscillation of the interlinked output voltage, particularly for feeding an AC motor, wherein the output voltage is formed alternately by the one and the other potential of the DC voltage supply and each half-wave of the phase voltages leads the associated potential continuously in first zones and in the form of impulses of variable width in second zones, comprising the steps of dividing each half-wave into six intervals of 30° each, forming a first zone with a constant voltage level in said third and fourth intervals, forming a second zone with $n$ pulses in the second and fifth intervals of the width 2B, and forming a third zone with $n$ pulses in the first and sixth intervals of the width X·2B, wherein $0.5 < X < 1$, $n \geq 1.5$ and B is variable.

2. A method according to claim 1, including the step of making the center spacings of said pulses of said second and third zones are equal.

3. A method according to claim 1 including the step of making the center spacings of said pulses of said second and third zones equal when $n > 2$.

4. A method according to claim 1, characterised in that X lies between 0.7 and 0.8.

5. A method according to claim 4, characterised in that with $n = 1.5$, X is substantially 0.78.

6. A method according to claim 4, characterised in that with $n = 2$, X is substantially 0.75.

7. A method according to claim 1, characterised in that by means of impulses exceeding the interval limits, $n$ is a fraction, particularly 3/2, 5/2, 7/2 etc.

8. A method according to claim 1 including the steps of providing a first control voltage and deriving said pulses in said second zone from the points of intersection between said first control voltage, providing a second control voltage and deriving said pulses in said third zone from the points of intersection between said second control voltage, said second control voltage having a fixed relationship to said first control voltage and to a wave train having a frequency which is a multiple of the output frequency.

9. A method according to claim 1, characterised in that $n$ is changeable in relation to the desired frequency of the output voltage and increases with a drop in frequency.

10. Control apparatus for a three phase inverted rectifier having switching elements, a wave train generator having the frequency thereof determined by a first control signal, a cycle generator having the frequency thereof determined by said wave train generator, a zone signal generator controlled by said cycle generator, two impulse width signal generators which deliver two impulse signals of different widths in dependence on the points of intersection between said wave train and second and third control signals respectively with said third signal being derived from said second signal, a logic portion depending on said zone signals and said impulse width signals to produce switching control signals for operating said switching elements of said inverted rectifier, said zone signal generator producing different interval signals each extending over 30°, and a logic portion delivering switching control signals when interval signals for the third and fourth interval are present, when width signals for the wide impulses and intervals signals for the second and fifth interval are present, and when width signals for the narrow impulses and interval signals for the first and sixth interval are present.

11. Control apparatus according to claim 10, wherein said wave train generator is a voltage-controlled oscillator, said cycle generator producing impulses corresponding to the peaks of said wave train, and summation and division elements being connected between said cycle generator and said zone signal generator.

12. Control apparatus according to claim 11, characterized in that said summation element adds the cycle impulses initiated by the positive and negative peaks of said wave train, said dividing element permitting only every third cycle impulse to pass.

13. Control apparatus to claim 12 including a network for receiving said first control signal which multiplies the first control signal by $m$, a gate following said cycle generator for dividing the number of cycle impulses by $m$, and a comparator in parallel with said network for monitoring the size of said first control signal and modifying $m$ in dependence thereon.

14. Control apparatus according to claim 10 wherein said third control signal is tapped from a voltage divider fed by said second control signal.

15. Control apparatus according to claim 10 including three flipflops delivering half wave signals for each phase, said flipflops being controlled by three interval signals from said zone signal generator, said logic portion having an OR element to which the third and fourth interval signals from said zone signal generator are supplied direct, said width signals for the wider impulses being supplied by way of an AND element which is also fed by the second and fifth interval signals of said zone signal generator, and the width signals for the narrower impulses being supplied constantly, and the output of which is linked to the half-wave signal in an AND element and in a NOR element.

* * * * *